UNITED STATES PATENT OFFICE.

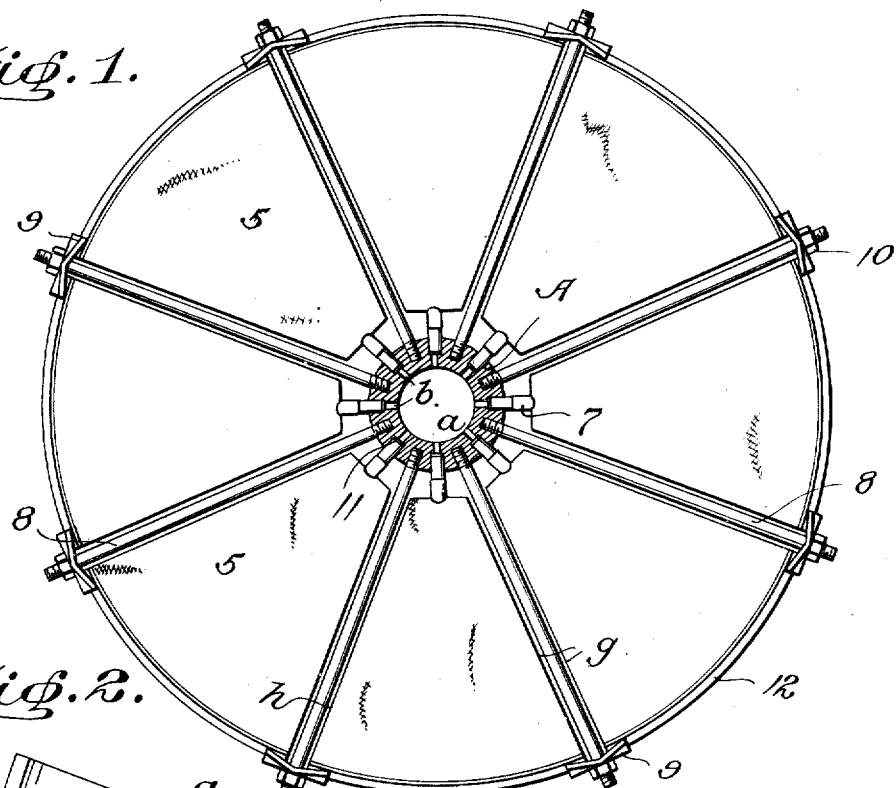
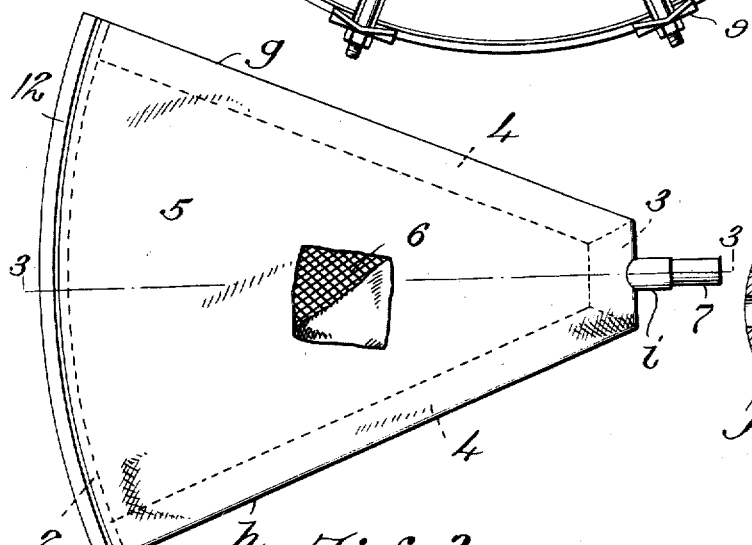
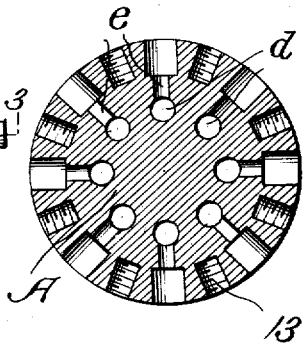
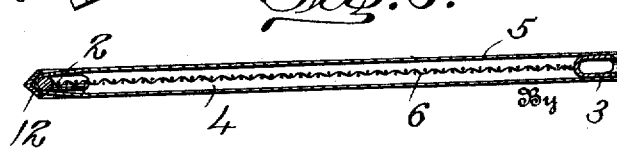

ORANGE JAMES SALISBURY, OF SALT LAKE CITY, UTAH, ASSIGNOR TO UNITED FILTERS CORPORATION, OF SALT LAKE CITY, UTAH, A CORPORATION OF DELAWARE.

FILTER LEAF OR DISK.

1,293,555.   Specification of Letters Patent.   Patented Feb. 4, 1919.

Original application filed May 24, 1917, Serial No. 170,771. Divided and this application filed August 31, 1917. Serial No. 189,126.

*To all whom it may concern:*

Be it known that I, ORANGE J. SALISBURY, a citizen of the United States, residing at Salt Lake City, in the county of Salt Lake and State of Utah, have invented certain new and useful Improvements in Filter Leaves or Disks, of which the following is a specification.

My invention relates to filtering apparatus, and particularly to a filter disk or leaf, of a sectional character, as I will hereinafter describe and claim.

While the present invention has been found particularly useful for metallurgical work, it is not limited to this use, since it may be successfully employed in other fields and substantially wherever the separation of liquids from solid matter is desired. It will be understood, therefore, that the filter disk or leaf which I am about to describe, is capable of almost universal use in the art of filtration, and hence I may employ it for filtering not only mineral-bearing slimes, but also for saccharin solutions, chemicals, and wherever it is the intention to separate a liquid from the solids, which accumulate upon the outside of the filter leaf or disk during the filtering operation.

In the accompanying drawings forming part of this specification and in which similar reference characters indicate like parts in the several views;

Figure 1 is a plan view of a sectional filter disk or leaf embodying my invention, showing in cross-section a central shaft upon which the disk or leaf is mounted.

Fig. 2 is a plan view of one of the sections of the filter leaf or disk removed and partially broken away.

Fig. 3 is a longitudinal sectional view on the line 3—3 of Fig. 2.

Fig. 4 is a cross-section of another form of shaft upon which the filter leaf may be mounted.

The present invention is directly related to and in fact may be considered as a division of my former application filed May 24, 1917, Serial Number 170,771, which discloses substantially the same form of filter disk or leaf; it is also related to the sectional form of filter disk or leaf described and claimed in my prior application, filed March 18, 1916, Serial Number 851,177, wherein the sections may be readily disconnected and removed from association with another section, or with corresponding filter-leaves where a plurality of such leaves are mounted side by side on a common shaft, without causing any disturbance of said other disks or leaves.

Heretofore, circular leaves mounted side by side on a central shaft have been so constructed that the assembling and removal of individual leaves has been rather cumbersome and time-consuming; to provide a simple construction affording easy means of assembling, disconnecting, and replacing sections or segments in each filter disk or leaf, when mounted on a central shaft, through which the filtrate is caused to flow, as in my prior application, Serial Number 170,771, before mentioned, is a leading object of the present invention.

The central shaft, A, may be of any appropriate type and is intended to be rotated so as to cause the filter disks or leaves carried thereby to rotate through a body of liquid to be filtered and which is supposed to be contained in an open tank or receptacle in which the lower part of the filter leaf is submerged, or in a closed cylindrical tank in which a part of or the entire leaf is submerged. The shaft may have a single internal passage, $a$, as indicated in Fig. 1, with ports, $b$, radiating therefrom and each connecting with one of the sections of the filter-leaf, but for some reasons, I prefer that the shaft shall be constructed with separate longitudinally extending filtrate passages, $d$, with ports, $e$, radiating therefrom as in my prior application, Serial Number 170,771, and as shown in Fig. 2 of the present drawing.

Each filter leaf or disk is of a sectional character and as many sections may be employed to form the complete leaf as may be desired. In the present instance, I have shown the leaf as composed of eight sections of substantially segmental form, each section comprising an outer rim, 2, an inner rim, 3, and outwardly diverging, preferably flattened tubes, 4, which extend along and form the side edges of the section. This arrangement constitutes a rigid metal framework, over which is stretched or otherwise placed a filtering fabric or bag, 5, which forms the sides of the section. Interior to the filter fabric and appropriately secured to the frame is a backing or reinforcing plate, 6, of woven wire or other foraminous material, for holding the fabric sides apart and forming an interior chamber into which the filtrate is forced or drawn, and which filtrate is finally delivered through the tubular members, 4 and a nipple extension, 7, of the frame to the central longitudinal shaft.

The interior reinforcing or backing plate may be constructed of various materials, such as double crimped wire-cloth, or it may be in the form of corrugated cast-iron, wood, vitrified tile, or any material rigid enough for the purpose and fashioned to permit the flow thereover of the filtrate which passes through the filtering sides, 5, to the interior of the frame, and from the latter to the central supporting tubular shaft, as before mentioned.

In the present instance, each of the filter leaves is secured on its periphery by means of an appropriate clamping mechanism, which comprises suitable radial rods, 8, extending substantially in the plane of the meeting edges of contiguous filtering sections, both ends of said rods being threaded, the inner ends being secured into threaded holes, formed in the circumference of the central shaft and the outer ends adapted to project beyond the circumference of the filter-leaf and to receive the clamping plates, 9, which may have greater length than width and sufficient length to bridge the joint between the edges of adjacent filter sections and to extend to a suitable distance over these sections, said plates having their inner faces notched to enable them to better conform to and seat upon the outer rim or periphery of the section, said clamping plates being tightly held upon the circumference of the filter leaves by means of nuts, 10, on the outer threaded ends of said rods. The adjustment of these nuts also forces the nipples, 7, of the sections into close engagement with gaskets, 11, and thereby causes the expansion or spreading of these gaskets to more effectually preserve leak-tight joints about the ends of the nipples, as will be well understood by those skilled in this art.

Ordinarily, the circular leaves of filters are attached to a central shaft with one outlet from the interior of the whole leaf to said central shaft. In order to remove such a leaf the entire series of leaves have to be slid off of the central shaft endwise after disconnecting them from said shaft. My present invention eliminates the necessity of removing any other leaf or portion thereof in order to recover any desired leaf with new filter cloth or medium, and this result may be obtained by forming the filter leaf of sections, such as above described, and holding these sections together and to the central shaft by some permanent means as the clamping plates and screw rods before mentioned, said rods and plates forming a so-called "spider," and said plates engaging a binder strip, 12, substantially V-shaped in cross-section, and forming the outer periphery of each section.

From this construction it will be apparent that in order to insert leaf-segments sufficient to form a complete circular disk or leaf, as shown in Fig. 1, the nuts, 10, on the outer ends of the screw rods, 8, are loosened and the clamping plates, 9, are swung aside to permit one leaf segment, as shown in Fig. 2, to be inserted so that its nipple, 7, will fit against the gasket, 11, seated in the bottom of threaded holes, 13, formed in the central shaft. The binding strip, 12, is then placed over the outside of the filter cloth, and forms the periphery of the segment, and the clamping plates at opposite sides of this section are turned so that their ends fit over said binding strip, the plates being preferably channeled or notched on their inner surfaces to conform more or less to the angular cross-section of the binding strip. When the parts are arranged as described, one of the nuts, 10, on one of the screw rods, 8, is tightened sufficiently to hold the segment in place. A second, third, fourth, etc., segment is likewise placed in the remaining spaces between the rods, 8, and the nuts, 10, tightened on the clamping plates, 9, and binding strips, 12, of these sections, until the filter-disk or leaf is completed. In tightening the nuts, 10, the force exerted through the tightening transmits itself through the clamping plates and binding strips to the rigid frame of the filter-leaf segment, which in turn transmits the tightening effect upon the end of its nipple, 7, and causes the same to bear tightly against the gasket to make a leak-tight joint as before mentioned. A decided advantage in the construction mentioned is that the whole operation just described is performed from the periphery of the filter wheel or disk.

In order to replace sections which are worn out with filter cloth or like medium, or for repairs, all that is necessary is to have freshly-dressed segments ready, and then the segments with faulty medium are readily removed by loosening the nuts, 10, turning the clamping plates aside and withdrawing the damaged section or sections. The new section is then inserted in the same manner as previously described.

The binding strip, 12, has a further advantage of preventing the filter-cake from forming around the periphery of the entire disk or leaf and from which leaf the cake would be difficult to dislodge was not the binder present, and on which binder it is difficult for the cake to adhere. Furthermore, in using segments covered with filter fabric of bag-form, the bags may be machine sewed around the edges as indicated at $g$, $h$ and $i$, and left open around the outer end or periphery. The bags are simply drawn over the segment and are made in such a size that the periphery may be folded over the rounded edge of the rigid framework of the filter-section, and then the angular binding strip placed over the folded edges of the bag so that when the strip is held tightly in place by the clamping plates, it is unnecessary to sew the open end at the periphery. The reason for this is that the binding strip bears down on the cloth folded over the rounded edge of the frame around the entire periphery of the segment, so that the folded cloth forms a gasket between the rounded edge and the binding-strip.

While the invention has been described with particular reference to the foregoing details of construction, the same is not considered as limited thereto as long as the radial rods, 8, which form spider-arms, and the central filtrate outlets and multiple segmental leaf idea are adhered to.

As before explained, the shaft of Fig. 2 shows a multiplicity of individual ports similar to that shown in my prior application, Serial Number 170,771, while the shaft shown in Fig. 1, has a single central passage which is common to all of the filter sections. Either form of shaft may be employed as the support for the filter leaf.

Having thus described my invention what I claim as new and desire to secure by Letters Patent is:—

1. A filter leaf or disk having a central opening for the reception of a shaft, said leaf or disk being formed of a plurality of segments each constituting a separate filtering unit and the whole forming a circular filter leaf when assembled, and means extending between the edges of adjacent sections whereby any one or more of said segments may be disconnected from the others without disarranging or disturbing the latter, or disconnecting the shaft.

2. A filter leaf or disk having central filtrate outlets, said leaf or disk being composed of a plurality of removable sections each having its individual filtering surface and interior filtrate chamber and filtrate outlet, and means engaging the periphery of the sections across the joint between adjacent sections for holding them inwardly against a central support, the filtrate outlets of the sections connecting with said support.

3. A filter leaf or disk open at the center and composed of a plurality of sections each of which includes a filtering medium and an interior filtrate chamber, said chambers being separate from each other and each having an outlet through the open center of the leaf, and means around the periphery of the leaf or disk and extending across the joint between adjacent sections for securing the sections to each other in a common plane and permitting the removal of any section of the leaf or disk without disturbing or disarranging the other sections of said leaf or disk.

4. A filter leaf or disk open at the center, and composed of a plurality of similar hollow segments each having its individual filter medium and filtrate chamber, the filtrate chambers of the several segments being non-communicating and each having a filtrate outlet through its inner end into the open center of the leaf or disk, and means around the periphery of the leaf or disk and extending across the joint between adjacent segments and operable from said periphery, for securing the segments together in a common plane and permitting any segment of a leaf or disk to be disconnected and removed without disarranging other segments of the same leaf or disk, or an adjacent leaf or disk.

5. The combination with a shaft having radial ports and filtrate conducting means, of a filter leaf or disk having central filtrate outlet ports, said leaf or disk being composed of readily removable filtering segments, means around the periphery of said leaf or disk and extending across the joint between adjacent segments and engaging said segments for detachably holding the segments by radial pressure in contact with the filtrate ports of said shaft, said means permitting the removal of any section or sections of the leaf without disturbing the other sections of the same leaf.

6. A filter leaf or disk formed of a plurality of segments each of which constitutes a filtering unit having its own filter medium and interior chamber for filtrate, and means around the periphery of the leaf or disk between the opposed edges of adjacent segments and adapted to exert an inward radial pressure on said segments for removably securing the sections in fixed relation to each other and to a common central filtrate-conducting support.

7. The combination with a shaft having a filtrate conduit and radial ports connecting therewith, of a filter leaf or disk having a central opening to admit said shaft, said leaf or disk comprising a plurality of filtering sections having filtrate chambers and outlets therefrom registrable with the ports in the shaft, and means around the periphery of said leaf or disk and extending between the opposed edges of adjacent sections and connected to the shaft and removably securing the sections radially of the shaft and permitting any section to be disconnected and removed without disturbing the shaft or another leaf therein or other sections of the same leaf or disk.

8. The combination with a central supporting member having a filtrate conduit and radial ports connecting therewith, of a filter leaf or disk having a central opening to admit said central member, said leaf or disk comprising a plurality of filtering sections having filtrate chambers and outlets therefrom registrable with the ports in the central member, and means around the periphery of said leaf or disk and connected to the central member and removably securing the sections radially of the central member and permitting any section to be disconnected and removed without disturbing the central member or another leaf therein or other sections of the same leaf or disk, said means comprising radial rods fixed to said central member and extending between the side edges of adjacent leaf sections, clamping agents on the outer ends of the rods adapted to overhang adjacent leaf sections, and means for removably holding the clamping agents under pressure against the leaf sections to secure leak-tight joints between the central member and filtrate outlets of the leaf sections.

9. A filter leaf or disk composed of a plurality of segments each including a rigid frame and a filter medium of bag-form inclosing the frame and having an open-side with its edges drawn over the outer end of the frame, a binding strip of channeled form fitted over the outer end of the frame and clamping the edges of said bag, and means for securing the binding strip in its clamping position on the frame.

10. A filter device comprising a plurality of sectors, each of which includes a radial draining member, a central shaft, and means extending between the side edges of adjacent sectors for releasably holding the draining member in communication with said shaft.

11. A circular filtering disk, comprising a plurality of sector-shaped filter units, in combination with means extending between the edges of adjacent units for holding said units independent, and a central shaft to which the units are connected said shaft having an outlet passage for filtered liquid.

In testimony whereof 1 affix my signature.

ORANGE JAMES SALISBURY.